United States Patent Office.

CHARLES H. FRINGS, OF CENTRETON, MISSOURI, ASSIGNOR TO HIMSELF AND CHARLES BRACHES, OF SAME PLACE.

Letters Patent No. 109,887, dated December 6, 1870.

IMPROVEMENT IN SACCHARIFYING MASH FOR GRAIN.

The Schedule referred to in these Letters Patent and making part of the same.

*To all whom it may concern:*

Be it known that I, CHARLES H. FRINGS, of Centreton, in the county of St. Louis and State of Missouri, have invented a new and improved Process of Saccharifying Mash; and I do hereby declare that the following is a full, clear, and exact description thereof, which will enable others skilled in the art to make and use the same.

The object of this invention is to produce a perfect saccharifying of mash without waste of malt.

For this object I add a small quantity of muriatic acid and phosphoric acid to the water used for converting the grain into mash—corn, rye, barley, wheat, or other grain being used.

The proportion of this addition is varied according to the quality of grain, but will usually be from two to four ounces for each bushel of grain.

The starch contained in the grain is, by the action of the said acids, prepared to enter in the process of saccharifying to be carried out by the malt.

This process, preceding that of fermentation, is always imperfect, as but half the amount of starch is saccharified, while the other half is brought no further than to dextrine and gluten.

In the same degree, however, in which the sugar contained in the wort is absorbed by the production of alcohol, will be the progress of the interrupted saccharifying process, provided that the wort still contains a sufficient quantity of malt in effective condition.

This condition depends chiefly upon the state of temperature to which the malt was exposed during the first saccharization. The higher this temperature, and the longer its action will be on the malt, the more will the saccharizing power of the malt be reduced during the second saccharizing process, which is carried on together with the production of alcohol.

In order to obtain a complete effect without using more malt, I use for the first saccharization, before fermentation, only a part of the malt to be employed, adding the remainder at two intervals to the wort, first, when fermentation commences to decline, and again when the wort has been nearly fermented ; whereupon, even at the lowest temperature, all those parts of the mash capable of conversion into sugar will be completely saccharified.

The above-named acids, which are combined at the rate of one part of phosphoric acid to sixteen parts of muriatic acid, are best adapted for preparing the starch in the desired manner, the one being the best solvent, while the other is digestive, neither of them sharing the disadvantages of sulphuric or sulphurous acids.

They may be used advantageously on grain of inferior quality, improving the same by the chlorine contained in the muriatic acid.

They do not injuriously affect the distilling-apparatus, as they are completely neutralized by sal soda, forming common salt. This latter prevents rectification, and increases the value of the slop as fodder.

Having thus described my invention,

I claim as new and desire to secure by Letters Patent—

The application to water, for converting grain into mash, of a combination of sixteen parts of muriatic acid, and one of phosphoretic acid, applied in the proportion of about three ounces to every bushel of grain, to operate preliminarily on the starch, as described.

CHAS. H. FRINGS.

Witnesses:
LOUIS WILLICH,
T. C. HILGARD, M. D.